(12) United States Patent
Nishihara et al.

(10) Patent No.: US 8,859,930 B2
(45) Date of Patent: Oct. 14, 2014

(54) THERMAL CUTTING MACHINE

(75) Inventors: Kenichi Nishihara, Komatsu (JP); Satoshi Ohnishi, Komatsu (JP)

(73) Assignee: Komatsu Industries Corporation, Komatsu-shi, Ishikawa (JP)

( * ) Notice: Subject to any disclaimer, the term of this patent is extended or adjusted under 35 U.S.C. 154(b) by 1652 days.

(21) Appl. No.: 12/084,599

(22) PCT Filed: Sep. 29, 2006

(86) PCT No.: PCT/JP2006/319405
§ 371 (c)(1),
(2), (4) Date: May 6, 2008

(87) PCT Pub. No.: WO2007/052430
PCT Pub. Date: May 10, 2007

(65) Prior Publication Data
US 2009/0045175 A1 Feb. 19, 2009

(30) Foreign Application Priority Data
Nov. 7, 2005 (JP) ................................. 2005-321734

(51) Int. Cl.
| | | |
|---|---|---|
| *B23K 10/00* | (2006.01) | |
| *B23K 37/00* | (2006.01) | |
| *B23K 26/30* | (2014.01) | |
| *B23K 37/06* | (2006.01) | |
| *B23K 7/10* | (2006.01) | |

(52) U.S. Cl.
CPC ............... *B23K 37/06* (2013.01); *B23K 37/006* (2013.01); *B23K 26/427* (2013.01); *B23K 10/00* (2013.01); *B23K 7/10* (2013.01)
USPC .................... 219/121.48; 219/121.5

(58) Field of Classification Search
USPC ............ 219/121.36, 121.39, 121.48, 121.56, 219/121.58, 121.6, 121.67, 121.68; 266/48, 266/49, 50, 65
See application file for complete search history.

(56) References Cited

U.S. PATENT DOCUMENTS

| | | | |
|---|---|---|---|
| 5,556,560 A * | 9/1996 | Ahola et al. | 219/121.45 |
| 5,734,143 A * | 3/1998 | Kawase et al. | 219/121.43 |
| 2007/0091716 A1* | 4/2007 | Zeikus | 366/104 |

FOREIGN PATENT DOCUMENTS

| | | |
|---|---|---|
| JP | 09-271980 A | 10/1997 |
| JP | 10-137970 A | 5/1998 |
| JP | 10-202452 A | 8/1998 |
| JP | 2004-074254 A | 3/2004 |

OTHER PUBLICATIONS

Notification Concerning Transmittal of International Preliminary Report on Patentability, Chapter I of the Patent Cooperation Treaty, and Written Opinion of the International Searching Authority, for PCT/JP2006/319405, 5 sheets.

* cited by examiner

*Primary Examiner* — Brian Jennison
(74) *Attorney, Agent, or Firm* — Holtz, Holtz, Goodman & Chick PC

(57) ABSTRACT

Adhesion and accumulation of spatter onto a covering member that encloses the outer periphery of a torch is minimized and flying of spatter is confined within a narrow area. To this end, a covering member for enclosing a specified angular range of the outer periphery of a plasma torch 9 is provided and an opening portion 35 is formed between every adjacent shielding plates 34 in the covering member.

4 Claims, 10 Drawing Sheets

9(a)

9(b)

4(a)

4(b)

5(a)

5(b)

5(c)

5(d)

5(e)

5(f)

6(a)

6(b)

6(c)

6(d)

6(e)

7(a)

7(b)

8(a)

8(b)

9(a)

9(b)

10(a)

10(b)

THERMAL CUTTING MACHINE

This application is a U.S. National Phase Application under 35 USC 371 of International Application PCT/JP2006/319405 filed Sep. 29, 2006.

TECHNICAL FIELD

The invention relates to a thermal cutting machine such as plasma cutting machines and laser cutting machines.

BACKGROUND ART

In known thermal cutting machines such as plasma cutting machines, molten material in the form of spatter (i.e., a splash of molten metal) flying from cut parts scatters in the surrounding area owing to the pressure of gas (e.g., plasma gas) ejected from the torch in the course of thermally cutting a workpiece. This not only adversely affects the work environment but also could cause fire hazard in the factory. Such spatter is generated, scattering into the environment particularly during a piercing process that is performed at a start of cutting a workpiece and mostly flies in a horizontal direction along the workpiece.

As an attempt to solve the above problem, there have been proposed and practically used various techniques for preventing the flying of spatter by shielding around the torch during thermal cutting. One example of such prior art techniques is disclosed in Patent Document 1. According to the technique of Patent Document 1, a hood, vertically movable by an actuator, is disposed around the torch and a command is issued to the actuator to move the hood down so as to cover the torch at least during the piercing phase. This prior art technique has the effect that, during piercing, the hood can be lowered with its lower end coming into close contact with the workpiece to thereby shut off spatter, whereas, during cutting, a desired clearance is provided between the lower end of the hood and the upper face of the workpiece, thereby preventing undesirable interference between the hood and the workpiece.

Patent Document 1: JP-A-2004-74254

FIGS. 10(a) and 10(b) show a partial plan view and partial enlarged view, respectively, of the plasma cutting machine described in Patent Document 1. The hood of this embodiment is open at one side. As illustrated in FIG. 10(a), the plasma cutting machine 50 has a cutting table 51 for supporting a workpiece and a dust collector (not shown) that is disposed under the cutting table 51, for collecting spatter, fume, exhaust gas, and the like generated in the process of cutting. Positioned above the cutting table 51 is a Y-axis carriage 52 movable in the direction of an X-axis that is one of two axes intersecting each other at right angles in the plane of the cutting table 51. Positioned above the Y-axis carriage 52 is a Z-axis carrier 53 movable in the direction of a Y-axis that is the other one of the two intersecting axes. The Z-axis carrier 53 includes a Z-axis movable pedestal (not shown) that is freely movable in a Z-axis direction perpendicular to the X-axis direction as well as to the Y-axis direction (i.e., the direction perpendicular to the plane of the drawing). Mounted on the Z-axis movable pedestal is a plasma torch 54 for jetting a plasma arc.

A hood (covering member) 55 is placed so as to enclose the outer periphery of a nozzle provided at the tip portion of the plasma torch 54. This hood 55 can be moved up and down in relation to the plasma torch 54 by a lifting and lowering mechanism. Concretely, the hood 55 is opened at a side opposed to the Y-axis carriage 52 and therefore has a substantially ⊐ (Japanese letter)-shaped section. The use of the hood 55 causes spatter to fly positively in a direction toward the open side and the flying spatter is received by a curtain-like, heat-resistant fabric 56 that is disposed in the Y-axis carriage 52 so as to extend over the travel range of the Z-axis carrier 53. In consequence, the spatter is prevented from flying and scattering into the environment.

DISCLOSURE OF THE INVENTION

Problems that the Invention Intends to Solve

The above prior art system, however, has revealed the following problems.

(1) Since the hood 55 closely encloses the outer periphery of the nozzle, spatter 57 is likely to adhere to and deposit on the inner side of the hood 55 particularly at corners 55a, 55b (see FIG. 10(b)) especially in cases where the workpiece is thick. Such a spatter deposit falls onto the surface of the workpiece and the plasma torch 54 gets stuck in the deposit, causing abnormal cutting. To avoid this unfavorable situation, the inner side of the hood 55 needs to be frequently cleaned, which leads to degradation in the operational efficiency. A conceivable solution to this problem is such that the hood 55 is made large to increase the flying time of the spatter, thereby cooling the spatter before it adheres to the hood surface. This, however, raises another problem that the strokes of the Y-axis carriage 52 and the Z-axis carrier 53 are restrained to the degree corresponding to an increase in the size of the hood and the heavier hood imposes an excessive load upon the workpiece, causing a vibratory motion of the workpiece.

(2) Since the spatter is thrown back in a direction toward the plasma torch 54, there is a possibility that the nozzle and cap located at the tip portion of the plasma torch 54 is damaged by the spatter.

The present invention is directed to overcoming the above problems and a primary object of the invention is therefore to provide a thermal cutting machine wherein the amount of spatter adhering to and accumulating on the covering member that encloses the outer periphery of the torch can be cut to a bare minimum and the area where spatter flies and scatters can be limited.

Best Mode for Carrying Out the Invention

In accomplishing these and other objects, there has been firstly provided a thermal cutting machine for thermally cutting a workpiece, the machine comprising:

a torch for jetting out a plasma arc or a laser beam; and a covering member for covering at least a specified angular range of the outer periphery of the torch, wherein the covering member is constituted by a shielding plate provided with an opening portion (a first aspect of the invention).

The opening portion provided in the shielding plate may be a plurality of holes pierced in the shielding plate (a second aspect of the invention), a plurality of holes formed in a metal mesh (a third aspect of the invention), or a slit provided so as to extend upwardly from the lower end of the shielding plate (a fourth aspect of the invention).

Secondly, there is provided a thermal cutting machine for thermally cutting a workpiece, the machine comprising:

a torch for jetting out a plasma arc or a laser beam; and a covering member for covering at least a specified angular range of the outer periphery of the torch, wherein the covering member is composed of a plurality of shielding plates aligned with a clearance between every adjacent shielding plates and the clearances constitute an opening portion (a fifth aspect of the invention).

At least one of the shielding plates of the fifth aspect may be provided with a plurality of pierced holes, a plurality of holes formed in a metal mesh, or a slit extending upwardly from the lower end of the shielding plate (a sixth aspect of the invention).

Preferably, the shielding plates of the fifth aspect are arranged such that all straight lines radially directed from the substantial axial center of the torch within the specified angular range intersect at least one of the shielding plates (a seventh aspect of the invention).

Preferably, the shielding plates of the fifth aspect are inclined at a specified angle so as not to intersect straight lines radially directed from the substantial axial center of the torch at right angles (an eighth aspect of the invention).

Preferably, the shielding plates of the fifth aspect are bent at their respective outer ends in a direction along a circular arc centering on the substantial axial center of the torch (a ninth aspect of the invention).

Effects of the Invention

According to the first or fifth aspect of the invention, flying of spatter can be confined within a narrow area by use of a covering member that covers at least a specified angular range of the outer periphery of the torch. In addition, the covering member is provided with an opening portion to allow a flow of air from the nozzle of the torch to the opening portion. The provision of the opening portion enables a part of spatter to escape to the outside of the covering member through the opening portion after hitting against the covering member and losing its momentum, so that the accumulation of spatter on particular areas of the covering member can be minimized. As a result, occurrence of defective cutting caused by the spatter dropping onto the workpiece surface can be avoided and damage to the tip portion of the torch can be extremely reduced. Additionally, the need to frequently clean the inside of the covering member can be eliminated.

By employing the arrangement of the seventh aspect, the spatter flying radially from the torch is allowed to hit against the shielding plates and change its course without fail, whereby the spatter can be steadily cooled.

According to the arrangement of the eighth aspect, the spatter, which has hit against the shielding plates, can change its course without going back inwardly from the shielding plates so that the accumulation of the spatter on the shielding plates can be more reliably prevented.

According to the arrangement of the ninth aspect, the spatter can change its course to a non-diffusive direction after hitting against the shielding plates, so that a more reliable spatter flying inhibiting effect and spatter accumulation inhibiting effect can be ensured.

EXPLANATION OF REFERENCE NUMERALS

Figure 1:
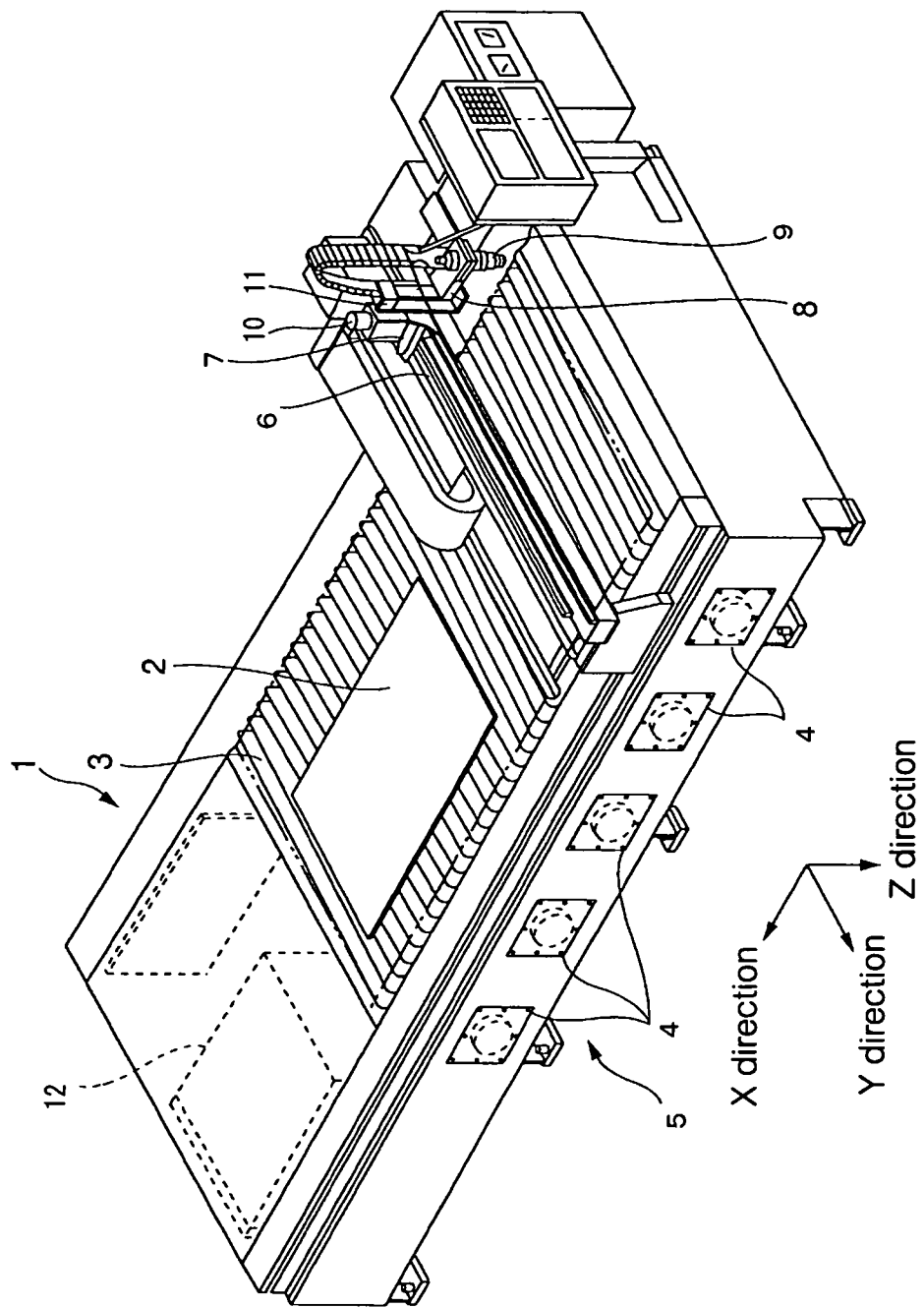
FIG. 1 is a perspective view of a plasma cutting machine according to a first embodiment of the invention.

1: plasma cutting machine
2: workpiece
3: cutting table
6: Y-axis carriage
7: Z-axis carrier
8: Z-axis movable pedestal
9: plasma torch
20: covering member
21: lower member
22: main body
23, 24: air cylinder
33: top panel
34, 34A to 34P, $34_1$ to $34_5$: shielding plate
35, 35A to 35Q: opening portion

BEST MODE FOR CARRYING OUT THE INVENTION

Referring now to the accompanying drawings, the thermal cutting machine of the invention will be described according to a preferred embodiment thereof.

Figure 2:
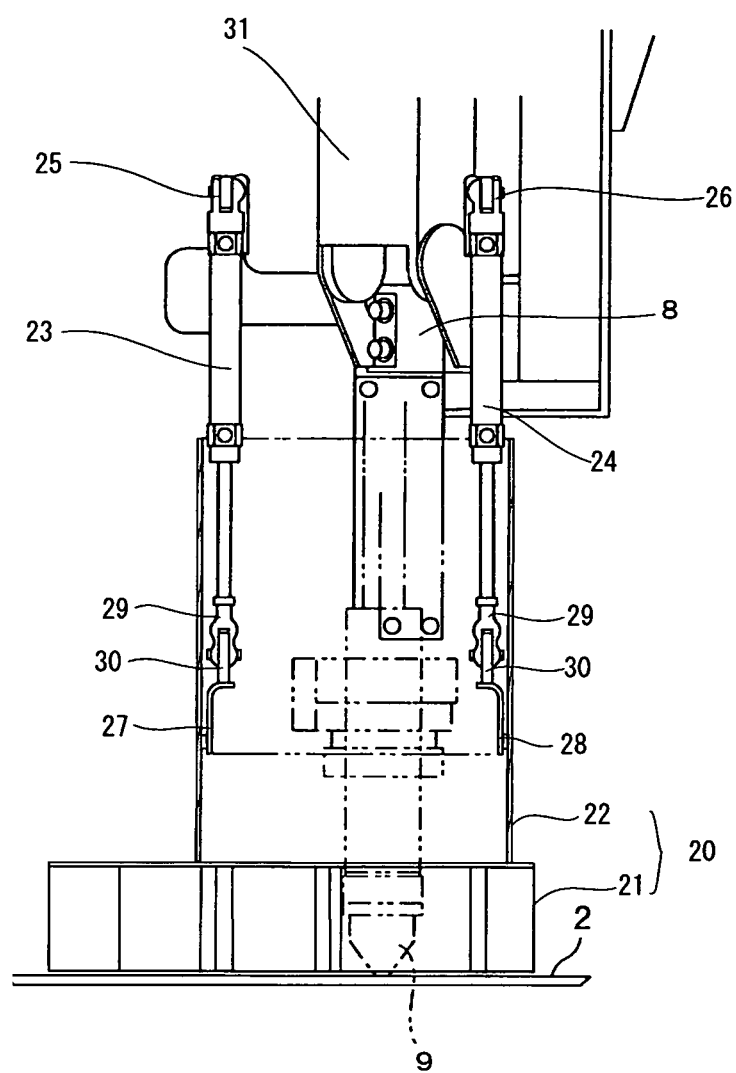
FIG. 2 is an enlarged front view showing the peripheral area of a plasma torch in the plasma cutting machine according to the first embodiment.
Figure 3:
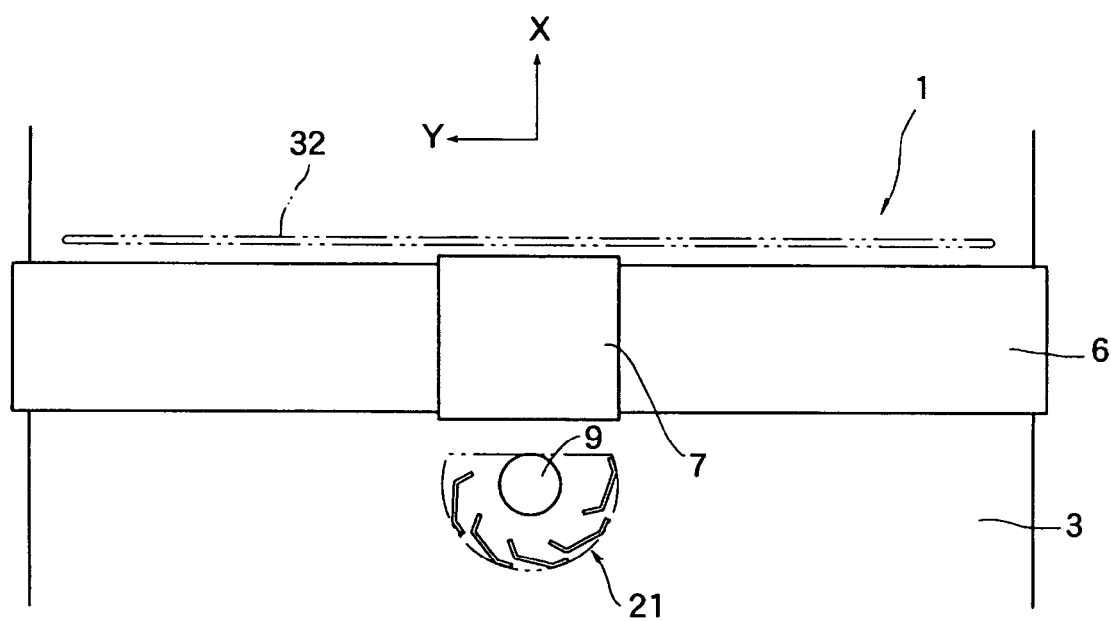
FIG. 3 is a partial plan view showing the peripheral area of the plasma torch in the plasma cutting machine according to the first embodiment.
Figure 4:
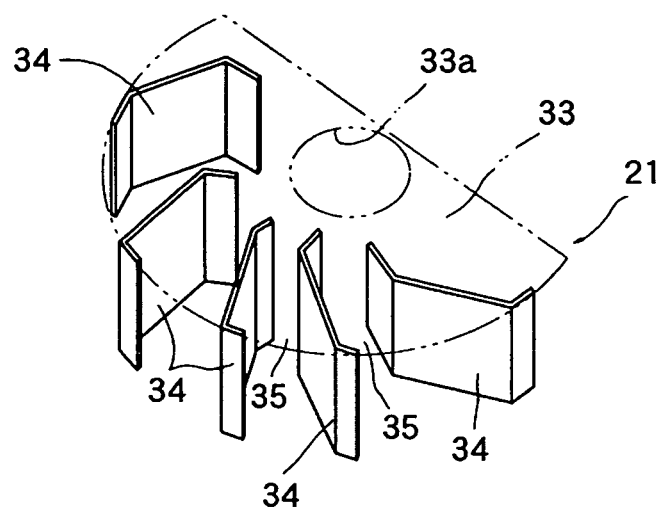
FIG. 4 is a perspective view (a) and plan view (b) of a lower member provided in a covering member.
Figure 4:
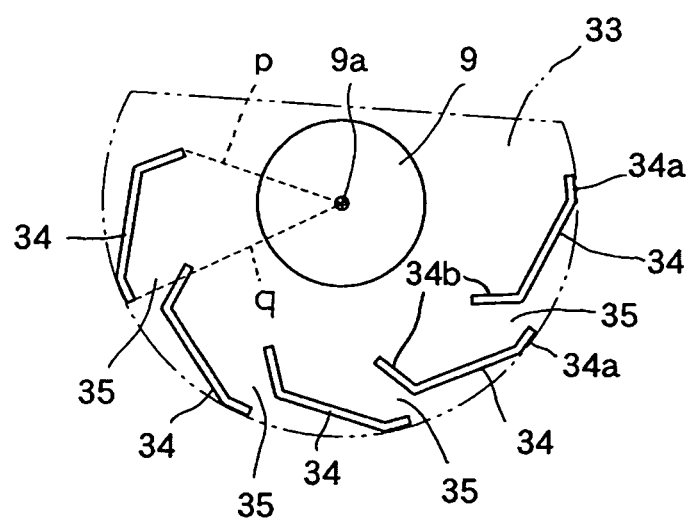

FIG. 1 is an overall perspective view of a plasma cutting machine constructed according to a first embodiment of the invention. FIGS. 2, 3 are an enlarged front view and partial plan view, respectively, of the peripheral area of a plasma torch. FIG. 4 shows a perspective view (a) and plan view (b) of a lower member provided in a covering member.

The first embodiment provides a plasma cutting machine 1 equipped with a cutting table 3 for supporting a workpiece 2. Provided under the cutting table 3 is a dust collector 5 composed of a plurality of push-pull type fans 4 which are placed on a side face portion opposed to the cutting table 3. Spatter, fume, high pressure gas (exhaust gas) and the like, which are generated in the process of cutting, are collected with this dust collector 5. Positioned above the cutting table 3 is a Y-axis carriage 6 movable freely in the direction of an X-axis that is one of the two axes intersecting each other at right angles in the plane of the cutting table 3. Positioned above the Y-axis carriage 6 is a Z-axis carrier 7 movable freely in the direction of a Y-axis that is the other one of the two intersecting axes. The Z-axis carrier 7 has a Z-axis movable pedestal 8 that is freely movable in the direction of a Z-axis perpendicular to the X-axis and Y-axis. Mounted on the Z-axis movable pedestal 8 is a plasma torch 9 for jetting out a plasma arc. The Y-axis carriage 6 is actuated in the X-axis direction by an X-axis servo motor (not shown), the Z-axis carrier 7 is actuated in the Y-axis direction by a Y-axis servo motor 10, and the Z-axis movable pedestal 8 is actuated in the Z-axis direction by a Z-axis servo motor 11.

A control unit 12 is provided which outputs an NC control command to the X-axis servo motor, Y-axis servo motor 10 and Z-axis servo motor 11 respectively in accordance with a desired workpiece processing NC program. This control unit 12 controls the position and speed of the plasma torch 9 with respect to each axis, thereby cutting the workpiece 2 into a predetermined shape.

As illustrated in FIGS. 2, 3, the plasma torch 9 has a covering member (hood) 20 for covering the outer periphery of the plasma torch 9 to shut off spatter. Herein, the covering member 20 includes a lower member 21 for covering the outer periphery of a nozzle provided at the tip portion of the plasma torch 9 and a main body portion 22 mounted on the top of the lower member 21, for supporting the lower member 21. The main body portion 22 is vertically movable relative to the Z-axis movable pedestal 8 by a lifting and lowering mechanism composed of air cylinders 23, 24.

The air cylinders 23, 24 are swingablly supported, by pins, on supporting brackets 25, 26, respectively, the proximal ends of which are attached to the Z-axis movable pedestal 8. Brackets 27, 28 are attached to the main body portion 22 of the covering member 20. The rod end portions of the air cylinders 23, 24 are swingablly coupled to the brackets 27, 28 respectively through a knuckle 29 and a knuckle bearing 30. By operating the air cylinders 23, 24 so as to expand and contract, the main body portion 22 and lower member 21 of the covering member 20 can be lifted and lowered through the left and right brackets 27, 28.

A space is provided between the right and left air cylinders 23, 24, for accommodating an electric line for supplying electric power to the plasma electrode (not shown); a hose for supplying gas; and a hose for supplying and draining cooling water. The above electric line and hoses are disposed so as to extend along a flexible cable guide 31 that is attached to the Z-axis movable pedestal 8 at one end thereof and to the Z-axis carrier 7 at the other end thereof.

As illustrated in FIG. 3, the Y-axis carriage 6 is provided with a curtain-like, heat-resistant fabric 32 that extends over the travel range of the Z-axis carrier 7, for receiving spatter flying from the open side (described later) of the lower member 21 of the covering member 20.

Next, the detailed structure of the lower member 21 of the covering member 20 will be described with reference to FIG. 4.

The lower member 21 has a hole 33a through which the plasma torch 9 is inserted. The lower member 21 is composed of a top panel (upper shielding plate) 33 and a plurality of side shielding plates (hereinafter simply referred to as "shielding plates") 34. Note that five shielding plates are provided in this embodiment. The top panel 33 is formed from a partially, linearly cut circular-disk-like steel plate. The side shielding plates 34 are each formed from a steel plate and joined to the lower face of the top plate 33 so as to meet the upper shielding plate 33 at right angles.

Each shielding plate 34 is formed from a rectangular flat plate both ends (outer and inner ends 34a, 34b) of which are bent in the same direction at a specified (obtuse) angle. The shielding plates 34 are arranged with their outer bent ends 34a aligned on the circular arc rim of the top panel 33 at regular intervals, such that an opening portion (clearance) 35 is formed between every adjacent shielding plates 34. As seen from FIG. 4(b), each shielding plate 34 inclines at a specified angle such that it does not intersect, at any part thereof, straight lines p, q orthogonally but crosses one of the straight lines p, q that are radially directed from the center 9a of the plasma torch 9. With this arrangement, even if the spatter jetted out from the nozzle of the plasma torch 9 collides against any of the shielding plates 34, the spatter does not go back inwardly from the shielding plates 34 but can deflect from its course in an outward direction. Herein, the inner bent ends 34b of the shielding plates 34 have another function to provide fixing rigidity when the shielding plates 34 are attached to the top panel 33.

Thus, the upper part of the lower member 21 is shut off by the top panel 33 and all the sides of the lower member 21 but the side facing the Z-axis carrier 7 are shut off by the five shielding plates 34. On the other hand, the side of the lower member 21 facing the Z-axis carrier 7 is open. The spatter is allowed to actively fly and scatter toward this open side so that it is received by the heat-resistant fabric 32 attached to the Y-axis carriage 6.

Next, the operation of the covering member 20 of the above-described structure will be described.

When starting plasma cutting by use of the plasma cutting machine 1 of this embodiment, the plasma torch 9 is first moved to a cutting start point. After a plasma arc is generated at this cutting start point, the plasma torch 9 is lowered to perform piercing. After the plasma arc pierces the workpiece 2, the plasma torch 9 horizontally moves along a specified orbit, thereby cutting the workpiece into a desired shape.

In the piercing phase of the plasma cutting process, the hole in the workpiece 2 does not completely pass through to the other side and therefore the molten metal splash (spatter) generated by the jet force of the plasma gas has no way out except the area above the workpiece. As a result, all the spatter is blown off, especially, in a horizontal direction in the area around the plasma torch 9. The spatter generated during the piercing phase accounts for most of the amount of spatter generated in the entire cutting process.

In the piercing phase, the plasma torch 9 is horizontally moved to the piercing start point with the covering member 20 being lifted to the stand-by position at the upper end by the air cylinders 23, 24, and then, the plasma torch 9 is lowered from the piercing start point to a level at which piercing is started. Thereafter, the air cylinders 23, 24 are expanded to lower the covering member 20 to bring the lower end of the lower member 21 into close contact with the top face of the workpiece 2. In this condition, plasma gas is subsequently jetted out from the nozzle of the plasma torch 9 while a plasma arc being generated between the plasma electrode and the workpiece 2, and the plasma torch 9 is then lowered to start piercing. After the piercing phase has thus proceeded and the pierced hole has passed through completely to the other side, the air cylinders 23, 24 are contracted and the covering member 20 is raised to a specified level, whereby the operation enters the next cutting cycle.

In the piercing phase, the spatter is blown off, especially, in a horizontal direction in the area around the plasma torch 9. During this period, the spatter flying in an upward direction is caught by the top panel 33 whereas the spatter flying in a sidewise direction toward the Z-axis carrier 7 is received by the heat-resistant fabric 32 attached to the Y-axis carriage 6. The spatter flying in all sidewise directions but the direction toward the Z-axis carrier 7 collides against the shielding plates 34 so that it loses its momentum, changing its course in a non-diffusive direction after the collision.

Thanks to the shape and arrangement of the shielding plates 34 according to this embodiment, the spatter jetted in all sidewise directions but the direction toward the Z-axis carrier 7 collides against any of the shielding plates 34 and reflects off at a plurality of positions, so that it goes out deflecting from its course while being cooled. In this way, the flying spatter can be confined in a narrow area and the accumulation of the spatter onto the surface of the covering member 20 (shielding plates 34) can be minimized. In addition, since the lower member 21 of the covering member 20 opens outwardly in all directions, the spatter evenly scatters without accumulating in a particular direction. Accordingly occurrence of defective cutting caused by spatter falling and accumulating onto the workpiece surface can be avoided and damage to the tip portion of the plasma torch 9 can be extremely reduced. Additionally, the need to frequently clean the inner face of the covering member 20 can be eliminated which leads to a reduction in the frequency of replacement of the covering member 20 due to heat damage.

While the lower member 21 of the covering member 20 is open at the side facing the Z-axis carrier 7 in the foregoing embodiment, the lower member 21 may be closed at this side and instead, the shielding plates 34 having the same shape may be arranged around the entire circumference of the lower member 21.

While the shielding plates 34 of the lower member 21 are configured and arranged as shown in FIG. 4 in the foregoing embodiment, other various configurations may be employed as the shape of the shielding plates 34. FIGS. 5 to 9 show other embodiments of the shielding plates. Although the shielding plates are arranged around the entire circumference of lower member 21 in these embodiments, it is apparent that the side facing the z-axis carrier 7 may be opened like the embodiment described earlier.

Figure 5:
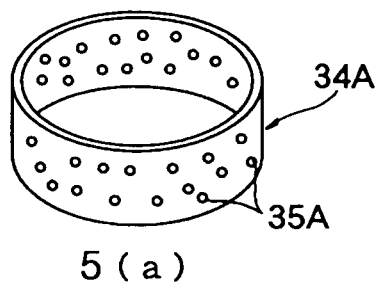
FIG. 5 is a view (1) showing one form of shielding plate.
Figure 5:
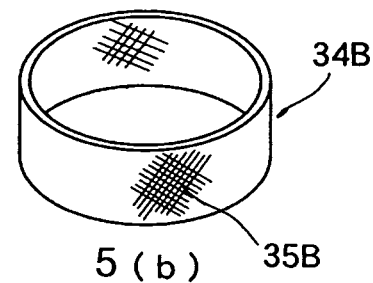
Figure 5:
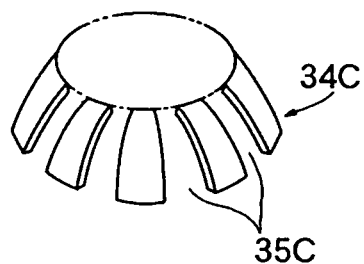
Figure 5:
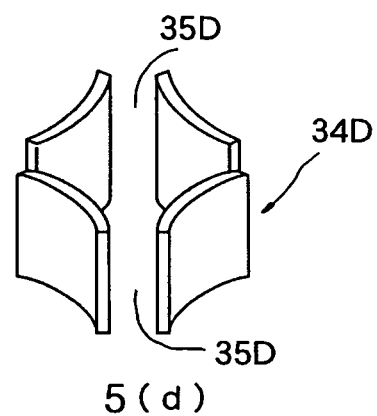
Figure 5:
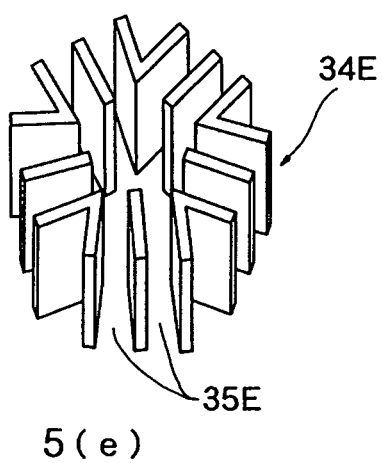
Figure 5:
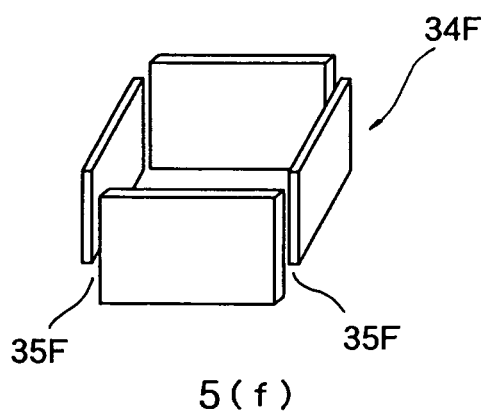

First, FIG. 5 shows examples in which opening portions are provided in a part of a shielding plate or between every adjacent shielding plates. The shielding plate 34A shown in FIG. 5(a) is formed by preparing a tubular punching metal and forming a number of opening portions (holes) 35A in this punching metal. The shielding plate 34B shown in FIG. 5(b) is formed by weaving a net-like material from steel bars and bending the net-like material into a tubular form whereby a number of opening portions 35B are provided. The shielding plates 34C, 34D shown in FIGS. 5(c), 5(d) are composed of many curved plates having an opening portion 35C (35D) between every adjacent plates. The shielding plates 34E, 34F shown in FIGS. 5(e), 5(f) are composed of many flat plates or bent plates (formed by bending flat plates) which are arranged around the plasma torch with an opening portion 35E (35F) between every adjacent plates. As seen from these examples, an air flow from the nozzle of the plasma torch to the opening portions 35A to 35F can be ensured by providing opening portions in a part of the shielding plate or an opening portion between every adjacent shielding plates, so that the spatter can collide against the shielding plates 34A to 34F so as to lose its momentum and then a part of it can escape outwardly from the shielding plates 34A to 34F through the opening portions 35A to 35F, thereby achieving the desired effect described earlier.

Figure 6:
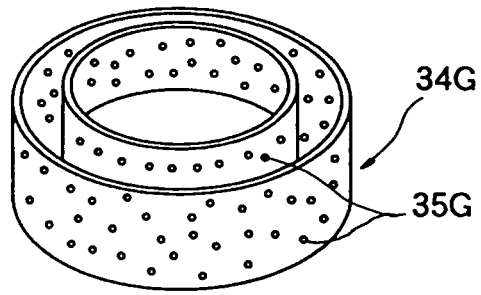
FIG. 6 is a view (2) showing another form of shielding plate.
Figure 6:
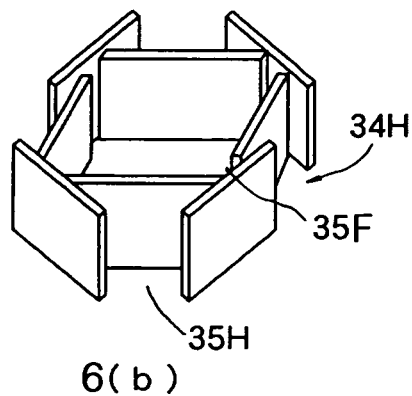
Figure 6:
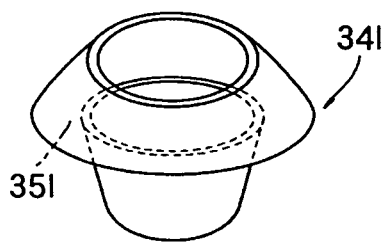
Figure 6:
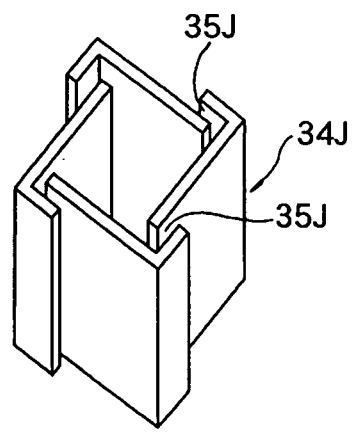
Figure 6:
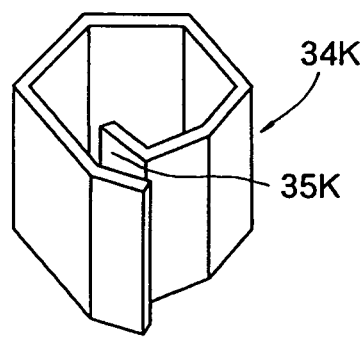

FIG. 6 shows examples in which the outer periphery of the plasma torch is partly or entirely enclosed by double shielding plate and opening portions are formed at desired positions. The shielding plates 34G shown in FIG. 6(a) are formed by preparing a double tubular punching metal and forming a number of opening portions 35G in this punching metal. The shielding plates 34H shown in FIG. 6(b) are formed by modifying the shielding plates 34F shown in FIG. 5(f) such that additional flat plates are placed over the opening portions 35F, forming an opening portion 35H between every adjacent flat plates. The shielding plates 34I shown in FIG. 6(c) are formed by preparing two types of curved plates in the form of circular truncated cone and forming an opening portion 35I between these two curved plates. The shielding plates 34J shown in FIG. 6(d) are formed by arranging L-shaped flat plates with an opening portion 35J between every adjacent flat plates. The shielding plate 34K shown in FIG. 6(e) is formed by bending a flat plate into a polygonal cylindrical shape such that its ends do not contact with each other but separate from each other with an opening portion 35K left therebetween. The double shielding plate configurations shown in these examples have a more effective spatter shutoff effect compared to the configurations shown in FIG. 5.

Figure 7:
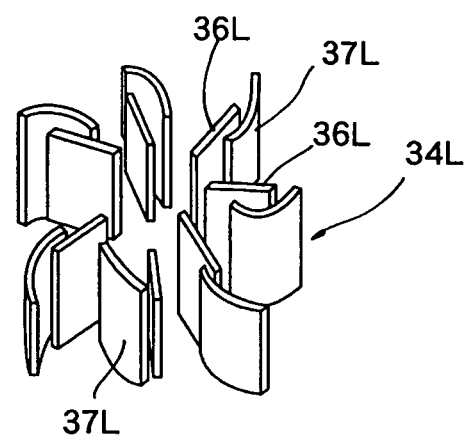
FIG. 7 is a view (3) showing yet another form of shielding plate.
Figure 7:
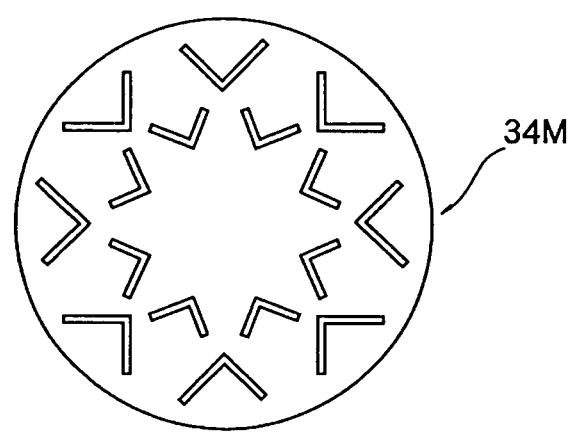

FIG. 7 shows examples in which many flat plates, curved plates and bent plates are disposed around the plasma torch similarly to the embodiment shown in FIG. 4, such that spatter hits against and bounds back from the surfaces of these plates, changing its course to an outward direction. The shielding plates 34L shown in FIG. 7(a) are arranged such that flat plates 36L are radially arranged with a curved plate 37L interposed between every adjacent flat plates 36L. The shielding plates 34M shown in FIG. 7(b) are such that many L-shaped flat plates are placed with their vertexes (i.e., the intersection of two sides of each flat plate) oriented inward. With the arrangements shown in these examples, spatter collides against and bounds back from any of the shielding plates, changing its course to an outward direction similarly to the case of the side shielding plates of FIG. 4, so that the flying and scatter of the spatter can be confined in a narrow area while minimizing the accumulation of the spatter onto the surfaces of the shielding plates.

Figure 8:
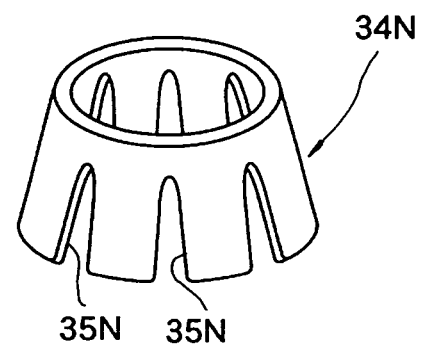
FIG. 8 is a view (4) showing still another form of shielding plate.
Figure 8:
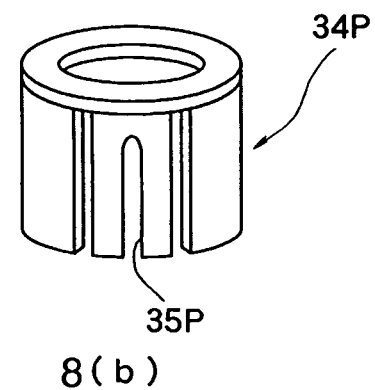
Figure 9:
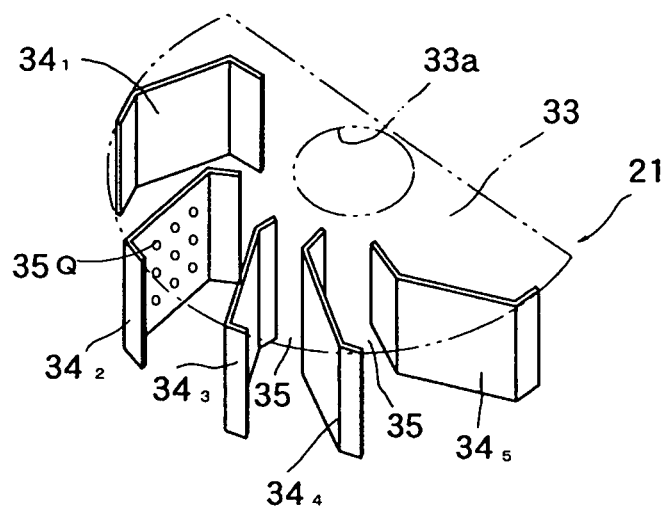
FIG. 9 is a view (5) showing still another form of shielding plate.
Figure 9:
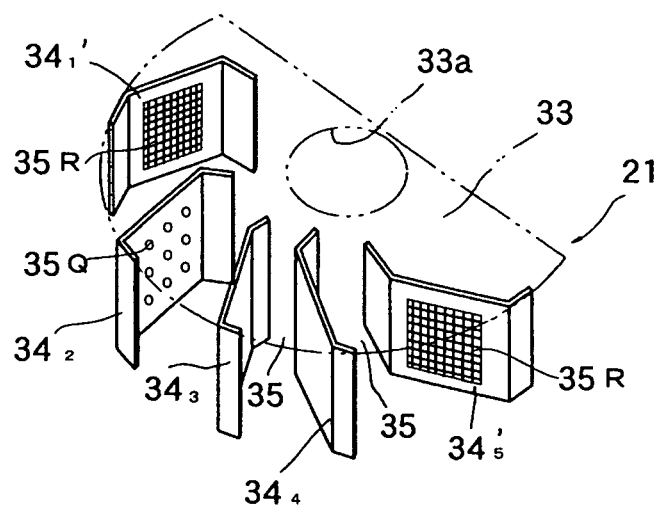
Figure 10:
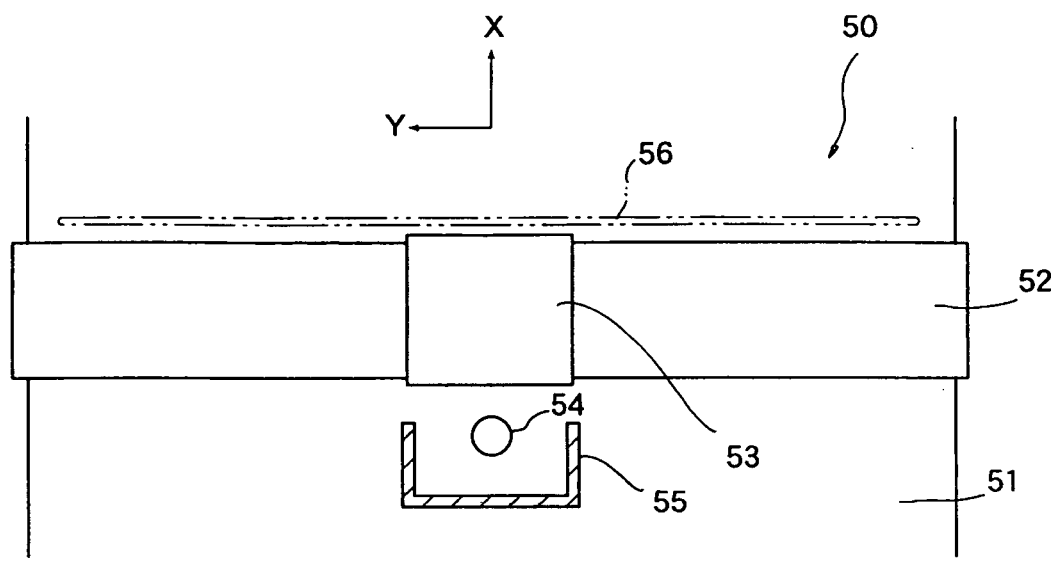
FIG. 10 is a partial plan view (a) and partial enlarged view (b) of a prior art plasma cutting machine.
Figure 10:
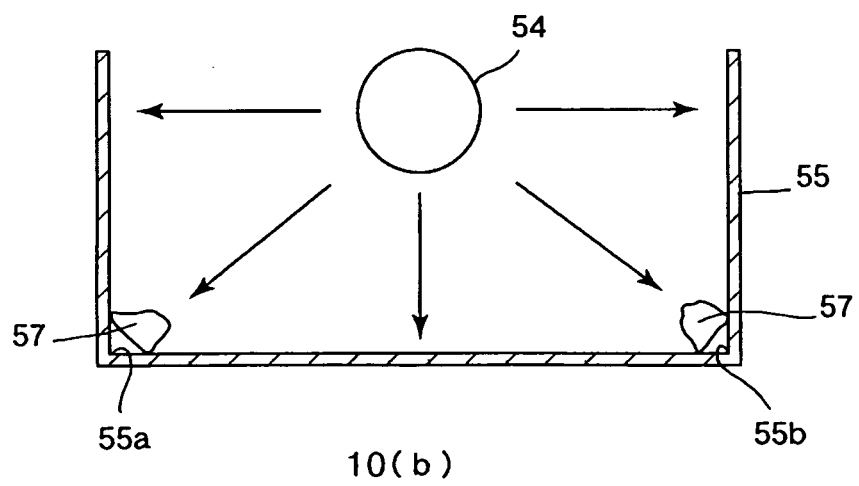

FIG. 8 shows examples in which the opening portions formed in the shielding plates 34N, 34P are in the form of a slit. The shielding plate 34L shown in FIG. 8(a) has, as the opening portion, slits 35N that extend upwardly from the lower end of the shielding plate 34L. In the example shown in FIG. 8(b), a slit 35P similar to those of FIG. 8(a) is formed in some of a plurality of shielding plates 34P. The opening portions in the form of a slit have the same effect as of the embodiments described earlier.

FIG. 9(a) shows an example in which only some of a plurality of shielding plates $34_1$, $34_2$, $34_3$, $34_4$, $34_5$, arranged similarly to the shielding plates 34 of FIG. 4 are provided with holes 35Q as the opening portions (in this embodiment, the shielding plate $34_2$ is provided with holes). FIG. 9(b) shows an example in which some of a plurality of shielding plates are constructed by a steel net to provide a number of opening portions 35B (in this embodiment, the shielding plates $34_1'$, $34_5'$ are constructed by a steel net), whereas some of the other shielding plates are provided with holes 35Q as the opening portions (in this embodiment, the shielding plate $34_2$ is provided with holes). In short, the example shown in FIG. 9(b) is associated with a case where the opening portions 35 each provided between adjacent shielding plates and the opening portions 35Q, 35R formed in the shielding plates themselves are utilized in combination.

While the shielding plates are made of steel plates in the foregoing embodiments, the shielding plates may be made from a heat-resistant fabric.

INDUSTRIAL APPLICABILITY

Although the invention has been described in the context of a plasma cutting machine in the foregoing embodiment, it is apparent that the invention is applicable to other thermal cutting machines such as laser cutting machines.

The invention claimed is:

1. A thermal cutting machine for thermally cutting a workpiece, the machine comprising:
a torch for jetting out a plasma arc or a laser beam; and
a covering member which comprises an upper shielding plate and a plurality of side shielding plates provided below the upper shielding plate,
wherein the side shielding plates are aligned with a clearance between every adjacent side shielding plate, the clearances forming an opening portion, wherein the side shielding plates are arranged such that all straight lines radially directed from a substantial axial center of the torch within the specified angular range intersect at least one of the side shielding plates, and wherein the side shielding plates are arranged so as to cover at least a specified angular range of an outer periphery of the torch, including an outer periphery of the plasma arc or the laser beam generated by the torch.

2. The thermal cutting machine according to claim 1, wherein at least one of the side shielding plates is provided with a plurality of pierced holes, a plurality of holes formed in a metal mesh, or a slit extending upwardly from the lower end of the side shielding plate.

3. The thermal cutting machine according to claim 1, wherein the side shielding plates are inclined at a specified angle so as not to intersect the straight lines radially directed from the substantial axial center of the torch at right angles.

4. The thermal cutting machine according to claim 1, wherein the side shielding plates are bent at respective outer ends thereof in a direction along a circular arc centering on the substantial axial center of the torch.

* * * * *